(12) United States Patent
Stokes

(10) Patent No.: US 9,420,773 B2
(45) Date of Patent: Aug. 23, 2016

(54) SWIM BAIT

(71) Applicant: Henry Stokes, Von Ormy, TX (US)

(72) Inventor: Henry Stokes, Von Ormy, TX (US)

(*) Notice: Subject to any disclaimer, the term of this patent is extended or adjusted under 35 U.S.C. 154(b) by 8 days.

(21) Appl. No.: 14/518,803

(22) Filed: Oct. 20, 2014

(65) Prior Publication Data
US 2015/0033612 A1 Feb. 5, 2015

Related U.S. Application Data

(63) Continuation-in-part of application No. 13/426,752, filed on Mar. 22, 2012, now abandoned.

(60) Provisional application No. 61/892,825, filed on Oct. 18, 2013.

(51) Int. Cl.
*A01K 85/02* (2006.01)
*A01K 83/00* (2006.01)

(52) U.S. Cl.
CPC .............. *A01K 85/02* (2013.01); *A01K 83/00* (2013.01)

(58) Field of Classification Search
CPC ....................................................... A01K 85/02
See application file for complete search history.

(56) References Cited

U.S. PATENT DOCUMENTS

| 1,173,694 | A | * | 2/1916 | Witty | A01K 85/02 43/35 |
|---|---|---|---|---|---|
| 2,205,773 | A | * | 6/1940 | Fox | A01K 85/02 43/35 |
| 2,456,705 | A | * | 12/1948 | Herring | A01K 85/02 43/42.41 |
| 3,081,572 | A | * | 3/1963 | Tomsello | A01K 85/02 43/35 |
| 4,782,618 | A | * | 11/1988 | Rainey | A01K 85/16 43/35 |
| 5,218,778 | A | * | 6/1993 | Szantor | A01K 85/02 43/42.41 |
| 5,367,818 | A | * | 11/1994 | Aduana | A01K 85/02 43/42.41 |
| 2003/0177687 | A1 | * | 9/2003 | Parrish | A01K 85/02 43/37 |
| 2011/0107653 | A1 | * | 5/2011 | Tsai | A01K 85/02 43/35 |
| 2012/0272564 | A1 | * | 11/2012 | Roberts | A01K 85/00 43/42.31 |
| 2014/0013648 | A1 | * | 1/2014 | Yong-Set | A01K 85/02 43/42.41 |
| 2014/0259870 | A1 | * | 9/2014 | Odem | A01K 85/02 43/42.41 |

* cited by examiner

*Primary Examiner* — Gary Hoge
(74) *Attorney, Agent, or Firm* — Michael D. Paul; Gunn, Lee & Cave, P.C.

(57) ABSTRACT

An artificial fishing lure with a body having an anterior end, a posterior end, a dorsum, and a ventrum, with the body being defined by an anteroposterior axis within a mid-sagittal plane. The body has a surface defining a dorsal channel in the dorsum. An opening extends through the body between the dorsum and the ventrum. A hook tip is fastened to an eyelet of a length of wire and extends through the opening. In the set position, the hook tip rests in the dorsal channel, with lateral movement of the bend being limited by the sidewall of the opening. The length of wire is disposed through the body and has a coil portion or a zig-zag portion.

12 Claims, 4 Drawing Sheets

SWIM BAIT

CROSS-REFERENCES TO RELATED APPLICATIONS

This continuation-in-part application claims the benefit of and priority to U.S. patent application Ser. No. 13/426,752, filed Mar. 22, 2012, which is incorporated by reference. This application also claims the benefit of and priority to an U.S. provisional application Ser. No. 61/892,825, filed Oct. 18, 2013, which is incorporated by reference.

STATEMENT REGARDING FEDERALLY-SPONSORED RESEARCH OR DEVELOPMENT

Not applicable.

BACKGROUND OF THE INVENTION

1. Field of the Invention

The present invention relates to terminal tackle. More specifically, the invention is an artificial fishing bait with a hook connected to and extending through an opening in the body with the hook tip resting within a channel formed on the dorsum of the body.

2. Description of the Related Art

Swim bait is a class of artificial bait that generally has a molded plastic body designed to imitate a bait fish. Swim bait typically includes one or more hooks extending from the top or bottom of the body. Typically, the lure bodies are sold separately from the hooks, meaning that the fisherman must rig to the lure and dispose the hooks through the body prior to use.

This design, however, often results in the hook or hooks catching or snagging on obstructions during use, especially in shallow water where vegetation and debris tend to grow and accumulate. In addition to possibly losing the lure, should the hooks catch on such obstructions, the fisherman wastes time removing the vegetation or tying on another lure.

Another problem with plastic-body lures is the tendency of the lures to tear or rip during use. In such cases, the fisherman has to dispose a new hook through a new lure body, which can be a time-consuming process, to make sure the hook is properly aligned in the mid-sagittal plane of the lure body for proper presentation.

Some lures position the hook tip into a small portion of the body in an attempt to keep the lure from obstructions. One drawback to this approach, however, is that positioning the hook under the surface of the plastic adds a great deal of resistance to movement of the hook, resulting in relatively more failed hook sets because the hook must penetrate through the plastic in order to embed the hook point in the fish's mouth. Many times, this results in the fisherman pulling the lure out of a targeted fish's mouth before the hook can penetrate the plastic.

Thus, a need exists for an improved artificial lure that reduces the chance of the hook snagging on environmental obstructions without reducing the chance of a proper hook set in a fish's mouth.

SUMMARY OF THE INVENTION

The present invention is a fishing lure that can be fished in shallow/skinny water, allowing the fisherman to provide a life-like presentation of a bait fish while minimizing the time required for the removal of obstructions, such as vegetation and debris. The lure may also be fished in deep water.

The present invention comprises a hook that is protected by a channel formed in the dorsum of the body shielding the hook tip from obstructions. As such, any vegetation or debris will move past the lure without entangling the hook as the line moves relative to the fishing environment.

The present invention comprises a body having an anterior end, a posterior end, a dorsum, and a ventrum, with the body being defined by an anteroposterior axis within a mid-sagittal plane and a coronal axis. The body comprises at least one surface defining a dorsal channel in the dorsum. An opening extends through the body between the dorsum and the ventrum. A hook having a hook eyelet, a shank, a bend and a tip. the hook eyelet is fastened to an eyelet and extends through the opening. In the set position, the hook tip rests in the dorsal channel, with lateral movement of the bend being limited by the sidewall of the opening. A length of wire is disposed through the body and has a first eyelet at least partially anterior to the anterior end of the body and a second eyelet adjacent to the ventrum of the body and within the ventral channel. In one embodiment, the length of wire has coil portion between the first eyelet and the second eyelet. In another embodiment, the length of wire has a zig-zag portion with at least one linear wire segment parallel to the coronal axis.

DESCRIPTION OF THE INVENTION

Figure 1:
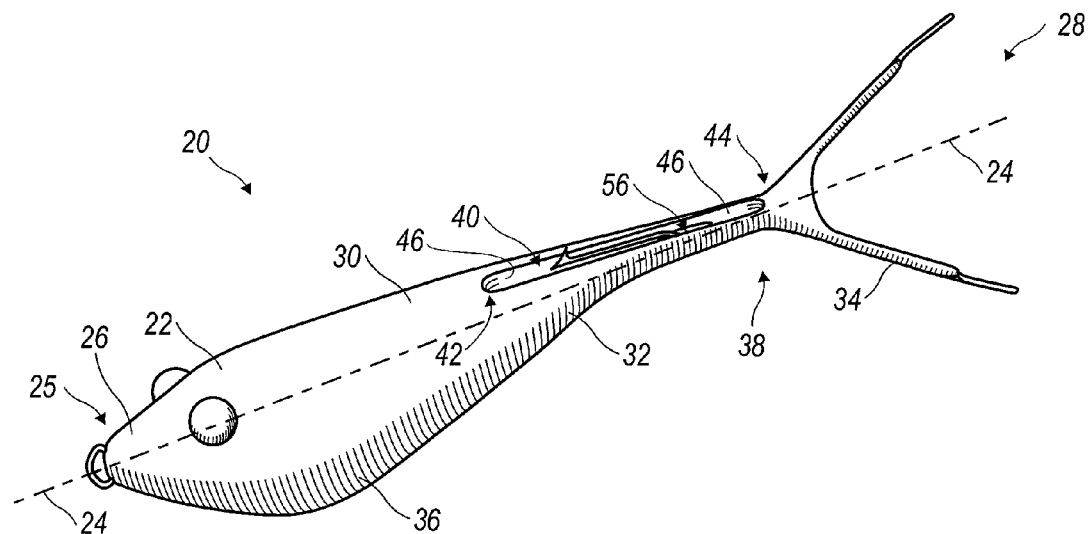
FIG. 1 is an isometric view of a preferred embodiment of the present invention.

FIG. 1 shows a preferred embodiment of a lure 20 having the features of the present invention, which comprises a body 22 having an anteroposterior axis 24, an anterior end 25 terminating in a snout 26, a posterior end 28, a dorsum 30, and a ventrum 32. The body 22 is in the general shape of a bait fish with a caudal fin 34, and a belly portion 36, and a tail section 38. The anteroposterior axis 24 lies within the midsagittal plane, which bisects the left lateral and right lateral halves of the body.

A dorsal channel 40 is formed in the body 22 aligned with anteroposterior axis and intersecting the mid-sagittal plane. The dorsal channel 40 extends from a first dorsal position 42 located proximal to or at the midpoint of the dorsum 30 to a second dorsal position 44 anterior of the caudal fin 34.

The dorsal channel 40 is defined by a channel surface 46. More specifically, the dorsal channel 40 is the volume defined by the channel surface 46 and the curvature of the body 22 that would exist absent the channel 40. In the embodiment described herein, the channel surface 46 is a single continuously-curved surface having a concave profile. Alternative embodiments anticipate the dorsal channel 40 being defined by multiple adjacent planar surfaces, which may have a V-shaped, U-shaped or other profile.

Figure 2:
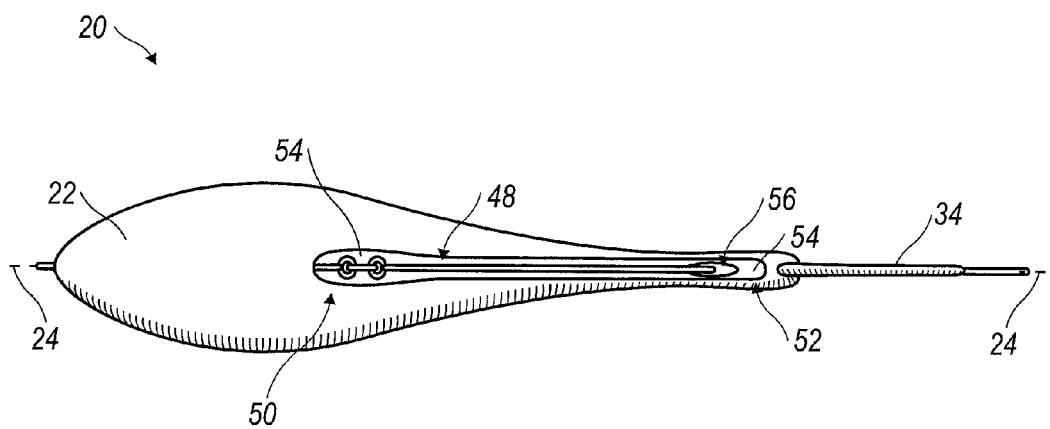
FIG. 2 is a bottom elevation of the preferred embodiment.

As shown in FIG. 2 ventral cavity 48 is formed in the body 22 and aligned with the anteroposterior axis 24 and intersecting the mid-sagittal plane. The ventral channel 48 extends from a first ventral position 50 to a second ventral position 52 anterior of the caudal fin 34. The ventral channel 48 is defined by a channel surface 54. More specifically, the ventral channel 48 is the volume defined by the channel surface 54 and the curvature of the body that 22 would exist absent the channel 48. In the embodiment described herein, the channel surface 54 is a single, continuously-curved surface having a concave profile. An opening 56 intersects the mid-sagittal plane and extends between the dorsal channel 40 and the ventral channel 48.

Figure 3:
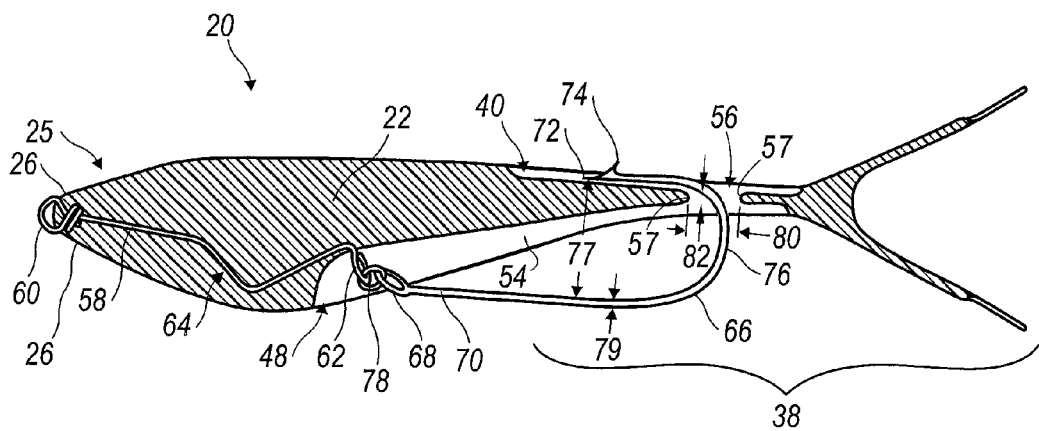
FIG. 3 is a side partial sectional elevation of the preferred embodiment through the mid-sagittal plane.

As shown in FIG. 3, a wire 58 is disposed through the body 22 between the anterior end 25 and the ventral channel 48. The wire 58 has an anterior eyelet 60 that extends from the snout 26. The wire 58 has a posterior eyelet 62 positioned in the ventral channel 48. The wire 58 is generally coplanar with the mid-sagittal plane. The wire 58 has a bent section 64.

A hook 66 is attached to the posterior eyelet 62 and comprises an eye 68, a shank 70, a point 72, a barb 74, a bend 76, and a gap distance 77. The eye 68 is connected to the posterior eyelet 62 of the wire 58 with a split ring 78. The hook has a thickness 79.

FIG. 3 shows the lure 20 in a "set" state—that is, a state in which it is desirable that the lure 20 be struck by an attacking fish. In this state, the shank 70 extends posteriorly from the ventral channel 48 generally toward the dorsal-ventral opening 56, which has a length 80. The hook 66 is positioned through the dorsal-ventral opening 56 with the point 72 resting in the dorsal channel 40. Lateral movement of the hook 66 within the dorsal-ventral opening 56 is limited by the sidewall 57 of the dorsal-ventral opening 56. The distance 82 from the dorsum to the ventrum through the opening 56 is less than the gap distance 77 of the hook 66.

Use of the embodiment is initially described with reference to FIG. 3. The lure 20 is rigged by tying a line onto the anterior eyelet 60 and configuring the embodiment in a "set" state as described supra. Thereafter, the lure 20 can generally be fished without further manipulation.

When moving in an aquatic environment, the position of the split ring 78 within the ventral channel 48 inhibits entanglement with vegetation and debris. The shape of the body 22 tends to cause the lure 20 to maintain the lure in an upright position, in which the tip 72 tends to stay within the dorsal channel 40. In this position, the shaft 70 is spaced from the ventral channel surface 54.

Figure 4:
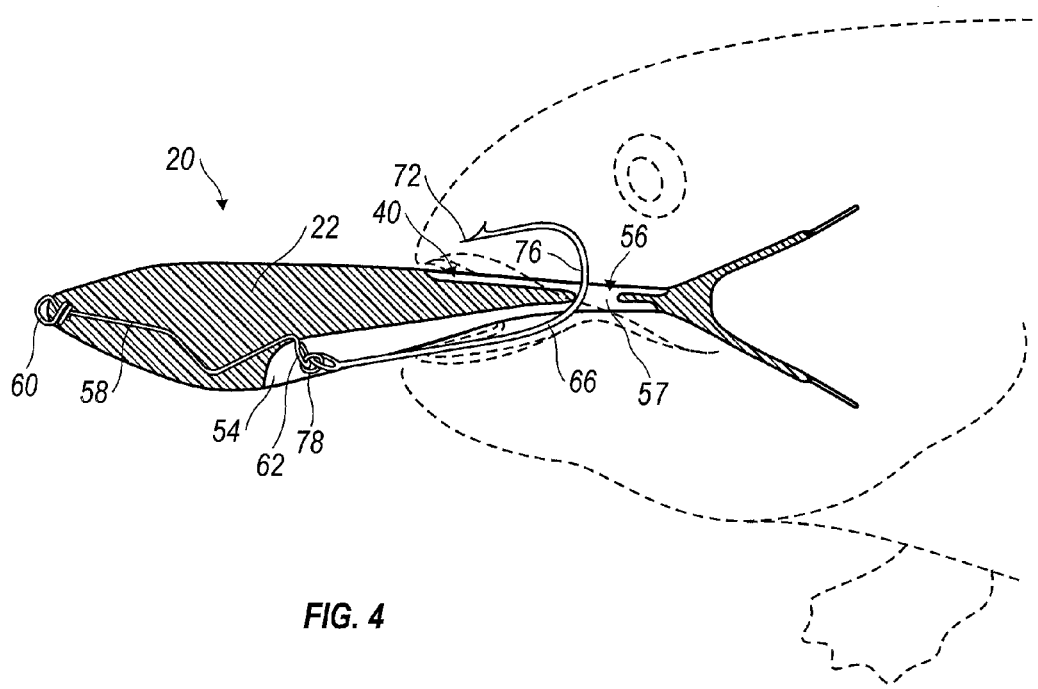
FIG. 4 is a partial sectional side elevation of the preferred embodiment with the hook in a position to set in an attacking fish's mouth.

As shown in FIG. 4, when the lure 20 is struck with sufficient force by an attacking fish, the hook 70 will be forced from the position shown in FIG. 3 and cause the hook 66 to rotate relative to the posterior eyelet 62 and move the tip 72 out of the dorsal channel 40, allowing the hook 66 to set in the fish's mouth. In the event, however, of a failed hook set, the dorsal channel 40 in combination with the limited range of lateral movement of the hook allowed by the position of the opening sidewall 57 directs the hook tip 72 back to the "set" position shown in FIG. 3. In addition to the foregoing advantages, the bent portion 64 of the wire 58 inhibits movement of the wire 58 relative to the body 22 when the wire 58 is under tension from forces acting on the anterior eyelet 60 and posterior eyelet 62.

Figure 5:
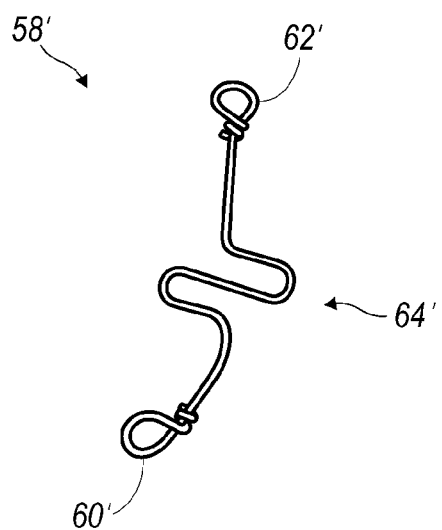
FIG. 5 shows an alternative embodiment of a wire that may be disposed through the body.
Figure 6:
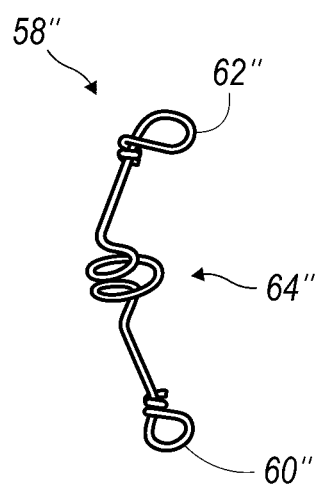
FIG. 6 show yet another alternative embodiment of a wire that may be disposed through the body.

FIG. 5 shows an alternative embodiment of a wire 58' with eyelets 60', 62' that may be disposed through the body 22 (see FIGS. 1-4). The wire 58' includes a zig-zag portion 64' that increases the surface area available to resist anteroposterior movement of the wire 58' within the body 22 when forces are acting on the eyelets 60', 62'.

Preferably the hook diameter is 1.52 millimeters, which provides for a more stable right-side-up swimming bait, quicker right itself effect when casted and worked with a twitch motion, a more natural and slightly quicker sink-rate ratio because of the added weight, a better hook set ratio on fish due to a fisherman being able to set a hook harder without the hook bending or breaking, a much stronger hook to decrease the chance of losing a hard fighting fish once it is hooked, and a reduces the chance the hook will bend or break under large amounts of stress and corrosion. Also, having a bigger-diameter wire the hook/shank it is less likely to break due to corrosion, rust, or damage.

The present invention is described in terms of a preferred embodiment in which a specific lure is described. Those skilled in the art will recognize that alternative embodiments of the lure can be used in carrying out the present invention. Other aspects and advantages of the present invention may be obtained from a study of this disclosure and the drawings, along with the appended claims.

I claim:

1. An artificial fishing lure comprising:
    a body having an anterior end, a posterior end, a belly portion, a tail section posterior of the belly portion, a dorsum, and a ventrum, said body being defined by an anteroposterior axis within a mid-sagittal plane and a coronal axis, wherein said body comprises at least one dorsal surface defining a dorsal channel in the dorsum and at least one ventral surface defining a ventral channel in the ventrum;
    a sidewall adjacent to the dorsum and the ventrum, the sidewall defining an opening extending through the body between the dorsum and the ventrum;
    a length of wire disposed through the body and having a first eyelet at least partially anterior to the anterior end of the body and a second eyelet adjacent to the ventrum of the body and entirely within the ventral channel, wherein the length of wire comprises a coil portion between the first eyelet and the second eyelet; and
    a hook having a hook eyelet, a thickness, a shank, a bend, a gap distance, and a tip, the hook eyelet being fastened to the second eyelet of the length of wire, the hook extending through the opening, wherein at least part of the shank between the anterior end and the posterior end is spaced a distance from the ventrum.

2. The artificial lure of claim 1 wherein the diameter of the tip of the hook is less than the depth of the channel.

3. The artificial fishing lure of claim 1 wherein the ventral channel extends between a first ventral position anterior of a first dorsal position and a second ventral position, the first dorsal position located proximal to the midpoint of the dorsum.

4. The artificial fishing lure of claim 1 wherein the dorsal-ventral opening, the dorsal channel, and the ventral channel intersect with the mid-sagittal plane of the body.

5. The artificial fishing lure of claim 1 wherein the length of wire comprises a plurality of segments not aligned with a reference line that intersects the anterior eyelet and the posterior eyelet of the wire.

6. The artificial fishing lure of claim 1 wherein the hook is rotatable about the second eyelet between a first position and a second position, wherein in the first position the tip is in contact with the at least one dorsal surface defining the dorsal channel.

7. The artificial fishing lure of claim 6 wherein in the second position the hook is in contact with the sidewall or the ventrum and the tip is not in contact with the body.

8. The artificial fishing lure of claim 1 wherein the distance from the dorsum to the ventrum through the opening is less than the gap distance of the hook.

9. The artificial fishing lure of claim 1 wherein the length of wire comprises at least three segments between the first eyelet and the second eyelet, at least two of the segments not aligned with the reference line that intersects the anterior eyelet and the posterior eyelet of the wire.

10. The artificial fishing lure of claim 1 wherein the length of wire comprises a plurality of linear segments between the first eyelet and the second eyelet, each segment being non-parallel to each other segment.

11. The artificial fishing lure of claim 1 wherein said belly portion has a maximum belly width in the coronal direction and said tail section has a maximum tail width in the coronal direction that is less than the belly width.

12. An artificial fishing lure comprising:
- a body having an anterior end, a posterior end, a belly portion, a tail section posterior of the belly portion, a dorsum, and a ventrum, said body being defined by an anteroposterior axis within a mid-sagittal plane and a coronal axis, wherein said body comprises at least one dorsal surface defining a dorsal channel in the dorsum and at least one ventral surface defining a ventral channel in the ventrum;
- a sidewall adjacent to the dorsum and the ventrum, the sidewall defining an opening extending through the body between the dorsum and the ventrum;
- a length of wire disposed through the body and having a first eyelet at least partially anterior to the anterior end of the body and a second eyelet adjacent to the ventrum of the body and entirely within the ventral channel, wherein the length of wire comprises a zig-zag portion between the first eyelet and the second eyelet, the zig-zag portion having at least one linear wire segment parallel to the coronal axis; and
- a hook having a hook eyelet, a thickness, a shank, a bend, a gap distance, and a tip, the hook eyelet being fastened to the second eyelet of the length of wire, the hook extending through the opening, wherein at least part of the shank between the anterior end and the posterior end is spaced a distance from the ventrum.

\* \* \* \* \*